United States Patent [19]
Yamauchi et al.

[11] 3,965,076
[45] June 22, 1976

[54] PROCESS FOR THE PRODUCTION OF MODIFIED CIS-14,-POLYISOPRENE

[75] Inventors: Junnosuke Yamauchi; Takayuki Okamura; Shobu Minatono, all of Kashima, Japan

[73] Assignee: Kuraray Co., Ltd., Kurashiki, Japan

[22] Filed: July 12, 1974

[21] Appl. No.: 488,059

[30] Foreign Application Priority Data
July 13, 1973  Japan.................................. 48-79449

[52] U.S. Cl............................... 260/42; 260/94.7 A; 260/894; 526/14; 526/56; 526/47
[51] Int. Cl.².......................... C08F 8/46; C08L 9/00
[58] Field of Search.................... 260/78.4 D, 94.7 A

[56] References Cited
UNITED STATES PATENTS

| | | | |
|---|---|---|---|
| 2,860,126 | 11/1958 | Cines.............................. | 260/94.9 F |
| 2,915,514 | 12/1959 | Denkowski...................... | 260/94.9 F |
| 3,257,363 | 6/1966 | Miller et al...................... | 260/94.9 P |
| 3,527,736 | 9/1970 | Aeyelts et al.................... | 260/78.4 D |
| 3,887,527 | 6/1975 | Okamura et al................ | 260/78.4 D |

*Primary Examiner*—Joseph L. Schofer
*Assistant Examiner*—Maria S. Tungol
*Attorney, Agent, or Firm*—Bacon & Thomas

[57] ABSTRACT

A modified cis-1,4-polyisoprene rubber having enhanced green strength is produced by reacting said rubber with maleic anhydride in a solvent including an aliphatic hydrocarbon or an alicyclic hydrocarbon or an alicyclic hydrocarbon; the efficiency of the reaction of the maleic anhydride is markedly increased by employing a relatively minor amount of an aromatic hydrocarbon in combination with the aliphatic or alicyclic hydrocarbon reaction solvent.

11 Claims, No Drawings

PROCESS FOR THE PRODUCTION OF MODIFIED CIS-14,-POLYISOPRENE

BACKGROUND OF THE INVENTION

1. Field of the Invention

The present invention relates to an improved process for producing a modified polyisoprene rubber having high green strength by reaction of maleic anhydride with synthetic high cis-1,4-polyisoprene rubber [hereinafter referred to as IR].

2. Description of the Prior Art

IR is a rubber which is widely used and is highly versatile. IR possesses a chemical structure analogous to that of natural rubber and also displays excellent processability characteristics, such as superior workability on rolls, low mill shrinkage and good extrudability; further, vulcanized products consisting thereof exhibit physical properties similar to those of natural rubber. However, IR has one serious shortcoming in that it possesses a rather poor tensile strength while in the unvulcanized state, the so-called "green strength", and this latter phenomenon has been deemed responsible for such adverse properties as bagging and deformation of any such unvulcanizate that could and would take place in any calendering or molding step, prior to vulcanization, in the various schemes for the manufacture of the various rubber articles.

To enhance and improve the green strength of IR, it is known in the art that IR can be reacted with maleic anhydride [hereinafter referred to as MAn]. Such reaction can be carried out, for example, (1) by that method of adding MAn to a solution of IR and thence heating said reaction mixture in the presence of a radical initiator, (2) by that method of reacting MAn with IR, in the solid state and in the absence of a solvent, or (3) by that method of conducting the reaction in an aqueous medium, as described in, for example, U.S. Pat. No. 3,644,248 and British Specification No. 1,168,388. Among the aforesaid methods, it has been considered most advantageous to react the IR with the MAn, in solution, because of the ready control over such reaction conditions as temperature and high uniformity of reaction.

It is technically important that the modification of IR, by reaction with MAn, be applicable on an industrial level, and be conducted economically. And for all practical purposes, it is a desideratum that any process for reacting the IR with the MAn be directly connected, combined or associated with that process employed for the production of the IR; the addition of any further process parameters to the reaction sequence should be avoided to as great an extent as possible. Exemplary in this regard, one such method is known whereby the IR formed during the process for the production thereof is first separated, but then is subsequently dissolved in an extraneous solvent to provide the medium for the reaction with the MAn. While it is of course preferred that the reaction between the MAn and the IR be carried out in solution, nevertheless the immediately aforesaid method is economically undesirable from the point of view that the additional parameters of separation and redissolution of the IR are involved. But since IR is obtained in solution form by the solution polymerization of isoprene, marked technical and economical advantages will be attained if the reaction between the MAn and the IR can be effected by adding the MAn directly to the IR solution originating from said solution polymerization of isoprene.

On an industrial level, IR is typically produced by solution polymerization of isoprene in such solvents as an aliphatic hydrocarbon, for example, n-hexane and butane, or an alicyclic hydrocarbon, for example, cyclohexane. The use of aromatic hydrocarbons as solvents for such polymerization does not produce a product of acceptably high molecular weight; hence, same are not employed on an industrial level. Nevertheless, as above mentioned, the reaction between IR and MAn, by adding the MAn to the solution of the IR in an aliphatic hydrocarbon or alicyclic hydrocarbon solvent which originates from the process for the polymerization of the isoprene, is satisfactorily acceptable in the usual industrial operation. However, upon reaction between IR and MAn in an aliphatic or alicyclic hydrocarbon solvent, considerable difficulties have been encountered in that the efficiency of reaction of the MAn is not sufficiently high and, in particular, it has been observed that the efficiency of the reaction of the MAn markedly diminishes as the amount of MAn utilized in the process is increased.

SUMMARY OF THE INVENTION

Accordingly, it is a primary object of the present invention to provide an improved process which obviates and overcomes the above difficulties associated with the reaction between the IR and the MAn, in solution, in an aliphatic or alicyclic hydrocarbon solvent.

Another object of this invention is to provide a modified IR characterized by an enhanced green strength, and wherein the process for the production thereof itself is characterized by markedly improved efficiency of reaction of the MAn.

Yet another object of the present invention is to provide an improved process for reacting IR with MAn, with high efficiency of reaction of MAn, in such a manner that said process of reaction can be directly connected, combined or associated with that process for the polymerization of isoprene which is conducted in an aliphatic or alicyclic hydrocarbon solvent medium.

Briefly according to the present invention, the above and other objects are attained by utilizing as the solvent of reaction, a solvent comprising an aliphatic or alicyclic hydrocarbon in admixture with a given amount of an aromatic hydrocarbon, namely, a reaction solvent containing a major amount of an aliphatic and/or alicyclic hydrocarbon and a minor amount of an aromatic hydrocarbon.

DETAILED DESCRIPTION OF THE INVENTION

The general process and catalyst parameters for the polymerization of isoprene in an aliphatic or alicyclic hydrocarbon solvent medium are well known in the art. The catalysts for the production of high cis-1,4-polyisoprene may be classified as Ziegler-type catalysts and anionic catalysts. Ziegler-type catalysts are preferably prepared from an organoaluminium compound and a titanium tetrahalide, and the polymerization reaction is usually carried out by contacting the isoprene with said catalyst, in the hydrocarbon solvent medium, at a temperature ranging from between about 0°C. to 150°C. Examples of such organoaluminium compounds include trimethyl aluminium, triethyl aluminium, triisobutyl aluminium, tri-n-butyl aluminium, tri-n-pentyl aluminium, triisooctyl aluminium and tricyclohexyl aluminium. Respecting the titanium tetrahalide, titanium tetrachloride is the preferred. Typical anionic catalysts for the production of IR comprise the lithium-based catalysts which contain lithium and/or lithium compounds. Among the more well known lithium-based catalysts, there are mentioned lithium metal, lithium hydrocarbyls and organolithium amides. Among the more preferred catalyst species, there are mentioned alkyl lithium compounds such as n-butyl lithium, sec.-butyl lithium, amyl lithium and isobutyl lithium. However, any Ziegler-type catalyst or anionic catalyst known to be useful for the solution polymerization of isoprene can be utilized according to this invention, and it is not intended that the subject process be limited in any way by reason of any catalyst parameter. Compare, for example, the U.S. Pat. Nos. 2,849,432, 2,856,391, 2,913,444, 3,114,743 and 3,135,725, and U.K. Specification Nos. 827,365 and 870,010 for a fuller description of the basic process and the catalysis thereof, and which are hereby expressly incorporated by reference.

In the present invention, when the maleinization reactants are directly added to the polymerization reaction mixture, it is recommended and highly preferred, prior to reaction between the IR and MAn, to first deactivate or decompose the polymerization catalyst by addition to the reaction mixture of such basic compounds as alkyl amines, polyalkyl polyamines, alkanol amines, polyalkanol amines and hydrazine, alcohols such as methanol and ethanol, or water.

According to this invention, it is required that the aromatic hydrocarbons be soluble, at reaction temperatures, in the aliphatic and alicyclic hydrocarbons such as n-butane, isobutane, n-pentane, neopentane, n-hexane, isooctane, cyclohexane and methyl cyclohexane. The preferred aromatic hydrocarbons are those having 6 to 12 carbon atoms, for example, benzene, alkyl substituted benzenes such as toluene, xylene, ethyl benzene and trimethyl benzene, and the naphthalenes. The preferred aliphatic hydrocarbons and alicyclic hydrocarbons are those having from 4 to 10 carbon atoms. It is most advantageous to utilize the said aromatic hydrocarbons in an amount of at least 10% by volume, based upon the total volume of the solvent. While too great an amount of the aromatic hydrocarbons may give rise to separation and recovery difficulties, with respect to the solvent, thus superimposing economic disadvantage, it is often permissible to utilize same in amounts of up to 50 and even 60% by volume. In more detail, in one preferred embodiment of this invention, an aromatic hydrocarbon is added to the IR solution originating from the solution polymerization of isoprene in an aliphatic or alicyclic hydrocarbon, same being followed by the addition of the MAn to said solution, to effect reaction thereof with the IR. Next, after the reaction is complete, the solvent is itself separated into the aliphatic or alicyclic hydrocarbon and aromatic hydrocarbon components, and thence the former hydrocarbon is recycled to the process for the polymerization of isoprene. Therefore, it is logically most preferred that use of the aromatic hydrocarbon in such an amount as to give rise to difficulties in the separation and recovery of the solvent be strictly avoided. The use of the aromatic hydrocarbons in an amount less than about 50 volume %, based on the total volume of the mixed solvent, is generally preferred. The reaction solvent used in the invention may also contain, in addition to the aforementioned hydrocarbons, small amounts of mono-olefinic hydrocarbons such as butene, pentene and hexene and/or diolefinic hydrocarbons such as unconverted isoprene monomer.

Specifically regarding the said reaction between the IR and the MAn, it has been noted, supra, that a much greater degree of reaction efficiency with respect to the MAn can be obtained according to the present invention, in contrast to reaction in a solvent consisting solely of an aliphatic or alicyclic hydrocarbon. Another marked advantage according to the present invention, and wherein an aromatic hydrocarbon is utilized as a cosolvent, in combination with such an aliphatic or alicyclic hydrocarbon, is that the formation of gel during the reaction is greatly suppressed. In the usual case an objectionable gel is produced during the reaction between the IR and the MAn, thus giving rise to many unwieldy problems, for example, operational difficulties due to the high viscosity of the reaction mass and a deterioration in the processability characteristics of the reaction product. This gel formation is quite pronounced when solely an aliphatic or alicyclic hydrocarbon is employed as the reaction solvent, whereas according to the invention any gelation is markedly suppressed by admixture of the aromatic hydrocarbon with the noted aliphatic or alicyclic hydrocarbons. Moreover, also according to the invention, the reaction is easily, readily conducted, and the modified IR produced thereby has excellent processability features.

In the present invention, the reaction efficiency (%) of MAn is the value calculated according to the following equation:

$$\frac{\text{Amount of MAn reacted with IR}}{\text{Amount of MAn employed}} \times 100$$

and the term "gel" as used herein denotes a benzene-insoluble fraction that can be filtered with a glass filter having micropores of a size ranging from about 20 to 30μ.

The concentration of the IR within the reaction system according to the invention is properly in the range of from about 3 to 20% by weight, based on the total weight of the reaction solution. When the concentration of the IR exceeds about 20% by weight, even when same exceeds about 15% by weight, the reaction mass may exhibit such a high viscosity as to prove to be detrimental to the course of the reaction. Therefore, in a given case, it will be necessary to add either an aliphatic or alicyclic hydrocarbon and/or an aromatic hydrocarbon as a diluent to the IR solution originating from the solution polymerization of isoprene, in order to adjust the concentration of the IR in the reaction system within the aforesaid limits for the subsequent maleinization thereof. The amount of said hydrocarbon to be added to the IR solution is properly determined in compliance with the actual concentration of the IR in said solution. In another instance, it may be necessary to remove a part of the aliphatic or alicyclic hydrocarbon solvent from the IR solution, at the time of adding the aromatic hydrocarbon to said solution, if the IR concentration in said solution is too low for the effective maleinization thereof. The MAn is typically employed in an amount of from between about 0.1 to 20 phr [phr = parts by weight per 100 parts by weight of rubber] consistent with the desired content of bound MAn within the resultant modified IR.

In the present invention, a radical initiator can be used to effectively catalyze the reaction between the IR and the MAn. The radical initiator employed in the present invention may be any of the conventional initiators, without limitation, heretofore used for the free radical polymerization of vinyl monomers, and include, only as exemplary, peroxides and hydroperoxides, such as benzoyl peroxide, lauroyl peroxide, diisopropyl peroxy dicarbonate, t-butyl peroxy pivalate, cumene hydroperoxide, t-butyl hydroperoxide, and the like; azoic initiators, such as 2,2'-azobisisobutyronitrile, 2,2'-azobis (4-methoxy-2,4-dimethylvaleronitrile), 2,2'-azobis (2,4-dimethylvaleronitrile), and the like; and redox initiators such as hydrogen peroxide - ferrous salt combinations, cumene hydroperoxide-amine combinations and the like. Among these initiators, the peroxides are the most preferable. The reaction between IR and MAn can also be conducted in the absence of the radical initiator. However, if it is required to carry out the reaction effectively at relatively low temperatures, for example, at 50° to 150°C., then the use of the radical initiator is recommended in an amount of between about 0.05 to 5 millimoles, preferably between about 0.05 to 3 millimoles, per 100 g of IR. When the radical initiator is used in an amount greater than 5 millimoles per 100 g of IR, cross-linking of the IR vigorously takes place, resulting in the extreme deterioration of the processability characteristics of the resultant modified IR.

Although the reaction temperature used in the invention can vary widely dependent upon the presence or absence of the radical initiator, or the particular type thereof, generally a reaction temperature of from about 50° to 250°C., and preferably from about 60° to 200°C., permits the MAn to react effectively with IR to produce the desired modified IR characterized by the enhanced green strength. When the radical initiator is not used, a relatively high reaction temperature of from about 100° to 250°C., particularly from about 120° to 200°C., preferably is employed. It is recommended that the reaction of the MAn and the IR be conducted under an atmosphere of inert gas, such as nitrogen, because the reaction is hindered in an atmosphere wherein molecular oxygen is present, for example, in air. The reaction times should be selected dependent on the reaction temperatures, the amounts of free radical initiator utilized and the amount of MAn, but, generally, from about 0.5 to 4 hours reaction time will suffice. The reaction can be terminated by any conventional technique employed in the typical free radical reactions, such as by adding a free radical polymerization inhibitor, lowering the reaction temperature, or pouring the reaction mixture into an excess amount of a non-solvent for the reaction product.

The method of the present invention is most applicable to cis-1,4-polyisoprene rubber having a cis-1,4 content of greater than about 90%, and preferably greater than 95%. It is well known in the art that an IR having such a high content of cis-1,4 configuration can readily be prepared, as heretofore mentioned, by solution polymerization techniques using anionic catalysts or Ziegler-type catalysts.

The MAn content bound to the polymer chain of the modified IR of the invention can be easily determined in accordance with desired degree of modification of the IR. Generally, it is preferred to adjust the bound MAn content in the modified IR to approximately 0.5 to 3.0 moles per 100 recurring units of isoprene monomer in the IR polymer. In the event where the modified IR obtained is to be used directly for the production of shaped articles, a relatively small content of bound MAn, for example, about 0.3 to 0.5 mole per 100 recurring units of isoprene monomer, may suffice. However, since for all practical purposes it is required to have stock available for the fabrication of a variety of products, having a variety of different bound MAn contents and for a variety of different purposes, it is most advantageous that the modified IR have a relatively high content of the bound MAn produced by the method of this invention and that said modified IR simply be blended with an ordinary IR [unmodified IR] to adjust the bound MAn content to the desired degree, depending upon the actual ultimate use intended. The bound MAn content in the modified IR can be controlled by changing the various reaction conditions, such as the amount of MAn added to the reaction mixture, the amount of the radical initiator employed, the reaction temperature and the reaction time. In the production of modified IR having greater amounts of bound MAn than necessary or desired for a given final product, and wherein it is intended to extend the same with ordinary IR, as aforesaid, it is suitable to employ the MAn in an amount of about 1 to 10 parts by weight per 100 parts by weight of IR, and the peroxide initiator in an amount of about 0.05 to 1.0 part by weight per 100 parts by weight of IR. Thus, the method of the invention is most applicable to the production of modified IR under said conditions. The ratio of admixture of the modified IR to the ordinary IR is preferably within the range of about 5:95 to 50:50 [by weight], in view of the necessity to provide a product having well-balanced physical properties, such as green strength, and processability, such as workability on rolls. In other words, any ultimate product should evidence the foregoing improved physical properties, without concomitant deterioration of processability. In this event, the bound MAn content in the modified IR is desirably in the range of about 0.1 to 3 moles, particularly 0.2 to 2.5 moles, per 100 recurring units of isoprene monomer.

The bound MAn content in any product according to the invention can be easily determined merely by dissolving the reaction product in benzene, and performing a neutralization titration thereon, using sodium hydroxide in a mixed solution of methanol-benzene [1:4, by volume] with bromthymol blue or phenolphthalein as an indicator. As a general rule, it can be said that the greater the amount of the maleic anhydride reacted with the IR, the higher the green strength of the resultant product.

By the term herein "maleic anhydride" to be reacted with the IR it is intended that the same include the various maleic anhydride derivatives. Accordingly, the modified IR produced according to the present invention includes the following types:

The first type of modified IR is an adduct obtained by reacting with IR with maleic anhydride, per se, according to the process described above.

A second type of modified IR which can be prepared according to the present invention is a product obtained by converting the bound maleic anhydride groups in the polymer [also produced by the above process] into the free acid form, the metal salt form, the mono- or di-ester form, the amide form or the imide form, by reacting such aforesaid first type with, for example, alcohols such as methanol, ethanol or n-butanol or amines such as ammonia, n-butylamine, isobutyl amine, allylamine, di-n-butylamine, monethanolamine, diethanolamine, triethylamine, triisopropanolamine, or pyridine, if necessary, in the presence of a catalyst such as p-toluene sulfonic acid. Thus, the maleic anhydride group may be converted into a maleic acid ester, such as the lower alkyl esters having from 1 to 8 carbon atoms. Likewise, the maleic anhydride group may be converted into the free acid form or the acid salt form [such as a metal salt] by hydrolyzing the acid anhydride group with either an acid or an alkali. Either one or both of the carboxylic groups of the maleic anhydride moiety may be converted into the corresponding ester, amine, amide or imide, or the free acid or acid salt form. The conditions for any such reaction are not critical, and those conditions which are generally employed for reacting an acid anhydride with the aforementioned reactants to produce the abovenoted derivatives can be employed; those skilled in the art being well aware of such techniques.

A third form of modified IR which may be produced according to the present invention comprises adducts obtained by reacting a maleic anhydride derivative [in lieu of maleic anhydride, per se] with IR, said maleic anhydride derivative including, for example, mono- or di-esters of maleic acid [such as the lower alkyl esters having from 1 to 8 carbon atoms], maleic acid amides or maleic acid imides. This form of modified IR can be produced by reacting the maleic acid esters, maleic acid amides, or maleimides with IR under the same reaction conditions as those discussed above respecting the reaction between the IR and the maleic anhydride, per se.

A fourth type of modified IR which may be produced according to the present invention is a polymer containing both maleic anhydride and any one or more of the aforementioned maleic anhydride derivatives in the molecular chain thereof. These polymers may be produced by incompletely reacting an adduct of IR with maleic anhydride, per se, with, for example, an alcohol or an amine, to incompletely convert the maleic anhydride group into, for example, an ester, an amide or an imide, or likewise the free acid form thereof, or the acid salt form thereof.

A fifth type of modified IR which may be thus produced comprises any mixtures of the above four types, such as a mixture of the first adduct with any of the second, third or fourth types of material.

Therefore, the terminology modified IR too is intended to include all of the above types of materials, all of same being capable of being produced according to the process of the invention.

The modified IR obtained by the method of the present invention exhibits enhanced green strength in and of itself, and also displays excellent green strength when in the form of a composition loaded or mixed with such compounding ingredients as zinc oxide, stearic acid, carbon block, calcium carbonate, silica, and the like, in contrast with a composition formulated from ordinary IR or the modified IR which is prepared by reaction of the IR and the MAn wholly in an aliphatic or alicyclic hydrocarbon solvent. Normally, a rubber material is added together with the compounding ingredients, for processing and moulding. Therefore, the immediately above advantage according to the present invention is even more dramatic.

In order to fully illustrate the present invention and the advantages thereof, the following specific examples are given, it being understood that same are intended only as illustrative and in no wise limitative.

EXAMPLES 1–3

High cis-1,4-polyisoprene rubber, prepared by solution polymerization of isoprene in an n-hexane solvent, utilizing a Ziegler-type catalyst [aluminium triisobutyl-titanium tetrachloride], and having a cis-1,4 content of 98% and an intrinsic viscosity $[\eta]$ of 3.2 dl/g measured in toluene at 30°C. and 2% of benzene-insoluble gel, was employed as the starting material IR.

To the IR solution originating from the aforesaid polymerization there was added n-hexane and toluene to formulate an IR solution having a concentration of 5 g/dl and containing the toluene in the amounts indicated in the Table I below. Said IR solution was admixed with 5 phr of maleic anhydride and 2 phr of benzoyl peroxide, and heated at 100°C. for 3 hours, upon being purged with nitrogen gas. The reaction mixture was thence poured into a large amount of acetone to precipitate the polymer and to remove the unreacted maleic anhydride.

The bound maleic anhydride content of the thus modified IR, and the green strength of the various carbon black-loaded compositions thereof were determined. These results are shown in Table 1, which evidences that the efficiency of reaction respecting the maleic anhydride is markedly increased and that a modified IR having a much higher green strength can be obtained by the use of n-hexane in combination with toluene, as a cosolvent, than is possible by the use of n-hexane alone.

TABLE I

| Example | Composition of the solvent (vol %) | | Bound MAn Content *1 | Reaction efficiency of MAn (%) | Gel content (%) | Green strength $[kg/cm^2]$ *2 | |
|---|---|---|---|---|---|---|---|
| | n-hexane | toluene | | | | Stress at 300% elongation | Tensile strength |
| 1 | 90 | 10 | 0.98 | 28.2 | 38 | 3.1 | 5.1 |
| 2 | 80 | 20 | 1.15 | 33.2 | 39 | 3.5 | 6.5 |
| 3 | 50 | 50 | 1.21 | 34.8 | 37 | 3.6 | 6.6 |
| Control 1 | 100 | 0 | 0.25 | 7.2 | 95 | 1.2 | 2.0 |

*1 = mole per 100 recurring units of isoprene monomer
*2 = Green strength of the composition prepared from the following compounding formulation:

| | |
|---|---|
| Modified IR | 20 (Parts by weight) |
| Starting material IR | 80 |
| Zinc oxide | 5 |
| Stearic acid | 3 |
| Antioxidant *3 | 1 |
| Carbon black HAF | 35 |

[Mooney viscosity $ML_{1+4}$ (100°C) of each composition was adjusted to 50]

TABLE I-continued

| Example | Composition of the solvent (vol %) | | Bound MAn Content *1 | Reaction efficiency of MAn (%) | Gel content (%) | Green strength [kg/cm²] *2 | |
|---------|---------|---------|---------|---------|---------|---------|---------|
| | n-hexane | toluene | | | | Stress at 300% elongation | Tensile strength |

*3 = 2,2'- methylene bis-(4-methyl-6-t-butylphenol)

EXAMPLE 4

High cis-1,4-polyisoprene rubber, prepared by solution polymerization of isoprene in an n-hexane solvent, utilizing a Ziegler-type catalyst, and having a cis-1,4 content of 97% and [η] of 3.1 dl/g, was employed as the starting material IR.

Said IR was dissolved in a mixed solvent consisting of n-butane and xylene [80:20 by vol] to provide a solution having an IR concentration of 10 g/dl, and to said solution there was added 5 phr of maleic anhydride and 0.5 phr of lauroyl peroxide. The solution was next heated at 85°C. for 2 hours under an atmosphere of nitrogen. Upon completion of the reaction, the reaction mixture was thence poured into a large amount of acetone to precipitate the polymer and to remove the unreacted maleic anhydride.

The bound maleic anhydride content of the prepared modified IR was 1.1 moles per 100 recurring units of isoprene monomer. Said modified IR was then blended with the starting material IR in an amount of 20% by weight, and the green strength of the resulting compositions, prepared in accordance with the same compounding formulation as in Example 1, was measured. As a control example, the reaction of IR and maleic anhydride was carried out in the same manner as above, except that n-butane alone was used as the solvent, and the composition was formulated using the thus obtained modified IR in the same compounding receipt to determine green strength. The results are shown in the Table II.

Table II

| Modified IR | Composition of the Solvent (vol %) | | Green strength [kg/cm²]* | |
|---|---|---|---|---|
| | n-Butane | Xylene | Stress at 300% elongation | Tensile strength |
| Example 4 | 80 | 20 | 3.4 | 6.4 |
| Control 2 | 100 | 0 | 1.1 | 1.2 |
| Starting Material IR | — | — | 0.6 | 0.5 |

*Green strength of each composition was measured at Mooney viscosity $ML_{1+4}$ (100°C.) of 50

EXAMPLE 5

Isoprene was polymerized in isopentane solvent at 50°C. utilizing aluminium tri-n-butyl-titanium tetrachloride catalyst system to provide a solution containing the formed IR at a concentration of 10 weight %.

After deactivation of the above Ziegler-type catalyst by addition of a small amount of methanol, benzene was added to the IR solution in such amount that the ratio of admixture of isopentane to benzene was 90/10 by volume.

To the resultant IR solution there was added 1 phr of maleic anhydride and 0.05 phr of diisopropyl peroxy dicarbonate, and the reaction therebetween was carried out at 70°C. for 2 hours. Upon reaction completion, the solution was poured into a large amount of acetone to precipitate the polymer and to remove the unreacted maleic anhydride.

The bound maleic anhydride content in the thus modified IR was 0.09 mole per 100 recurring units of isoprene monomer. The green strength was measured relative to the composition which was prepared by mixing said modified IR with the same compounding ingredients, in the same amounts, as in Example 1. For purposes of comparison, the same procedure as above outlined was repeated, except that isopentane alone was used as the reaction solvent, to form a modified IR having a bound maleic anhydride content of 0.05 mole per 100 recurring units of isoprene monomer, and a composition too was formulated therefrom according to the same compounding recipe for the determination of green strength. These results are shown in the following Table III.

Table III

| Modified IR | Composition of the solvent (vol %) | | Bound MAn content | Green strength [kg/cm²]* | |
|---|---|---|---|---|---|
| | Isopentane | Benzene | | Stress at 300% elongation | Tensile strength |
| Example 5 | 90 | 10 | 0.09 | 1.8 | 3.5 |
| Control 3 | 100 | 0 | 0.05 | 0.9 | 0.8 |
| Starting Material IR | — | — | 0 | 0.6 | 0.5 |

*Green strength of each composition was measured at Mooney viscosity $ML_{1+4}$ (100°C.) of 50

EXAMPLE 6

The reaction between the IR and the maleic anhydride was carried out in the same manner as in Example 4, except that cyclohexane was substituted for the n-butane. The bound maleic anhydride content in the thus modified IR was 1.3 moles per 100 recurring units of isoprene monomer.

Contrariwise, when the reaction was carred out using, as the solvent, cyclohexane alone and not in combination with the xylene, the bound maleic anhydride content in this particular modified IR was only 0.15 mole per 100 recurring units of isoprene monomer. Therefore, it can readily be seen that the efficiency of reaction of the MAn is markedly increased by using a mixed solvent containing a relatively small amount of the added xylene.

While there have been described and pointed out the fundamental novel features of the invention as applied to the preferred embodiments thereof, those skilled in the art will appreciate that various modifications, changes, and omissions in the method illustrated and described can be made without departing from the spirit of the invention. It is the intention, therefore, to be limited only by the scope of the claims which follow.

What is claimed is:

1. A process for the production of a modified cis-1,4-polyisoprene rubber having high green strength, which comprises adding an aromatic hydrocarbon having 6 to 12 carbon atoms to the solution of cis-1,4-polyisoprene rubber resulting from the solution polymerization of isoprene in a saturated aliphatic hydrocarbon having 4 to 10 carbon atoms or a saturated alicyclic hydrocarbon having 6 to 10 carbon atoms, the said aromatic hydrocarbon being added in an amount of from about 10 to 50% by volume, based on the total volume of the resulting cosolvent, and thence adding maleic anhydride thereto in an amount of from about 0.1 to 20 parts by weight thereof per 100 parts by weight of said rubber, whereby the reaction between said rubber and maleic anhydride efficiently proceeds, with concomitant gel formation being suppressed.

2. The process as defined by claim 1, wherein the cis-1,4-polyisoprene rubber is present in a concentration of from about 3 to 20% by weight in the reaction system, and is reacted with from about 0.1 to 20 parts by weight of the maleic anhydride, per 100 parts by weight of said rubber, at a temperature ranging from about 50° to 250°C., whereby there is produced a modified cis-1,4-polyisoprene having a content of bound maleic anhydride ranging from about 0.05 to 3.0 moles thereof per 100 recurring units of isoprene monomer in said cis-1,4-polyisoprene.

3. The process as defined by claim 2, wherein the cis-1,4-polyisoprene rubber is present in a concentration of from about 3 to 20% by weight in the reaction system and is reacted with from about 1 to 10 parts by weight of the maleic anhydride per 100 parts by weight of said rubber, at a temperature ranging from about 50° to 250°C., whereby there is produced a modified cis-1,4-polyisoprene having a content of bound maleic anhydride ranging from about 0.1 to 3 moles thereof per 100 recurring units of isoprene monomer in said cis-1,4-polyisoprene.

4. The process as defined by claim 1, wherein the reaction between the cis-1,4-polyisoprene rubber and the maleic anhydride is catalyzed with a free radical initiator.

5. The process as defined by claim 1, wherein the cis-content of the rubber is at least 90%.

6. The process as defined by claim 1, wherein the cis-content of the rubber is at least 95%.

7. The process as defined by claim 1, wherein the aromatic hydrocarbon is present in the cosolvent in an amount less than about 50% by volume.

8. The process as defined by claim 1, wherein the solution polymerization of the isoprene has been catalyzed, the said catalyst having been deactivated prior to addition of the aromatic hydrocarbon.

9. The process as defined by claim 1, further including ultimately separating the aliphatic or alicyclic hydrocarbon from the aromatic hydrocarbon, and thence recycling the said aliphatic or alicyclic hydrocarbon to the isoprene polymerization.

10. The product of the process as defined by claim 1.

11. A composition of matter including the modified polyisoprene as defined by claim 10, in admixture with a filler therefor.

* * * * *